Patented Aug. 28, 1928.

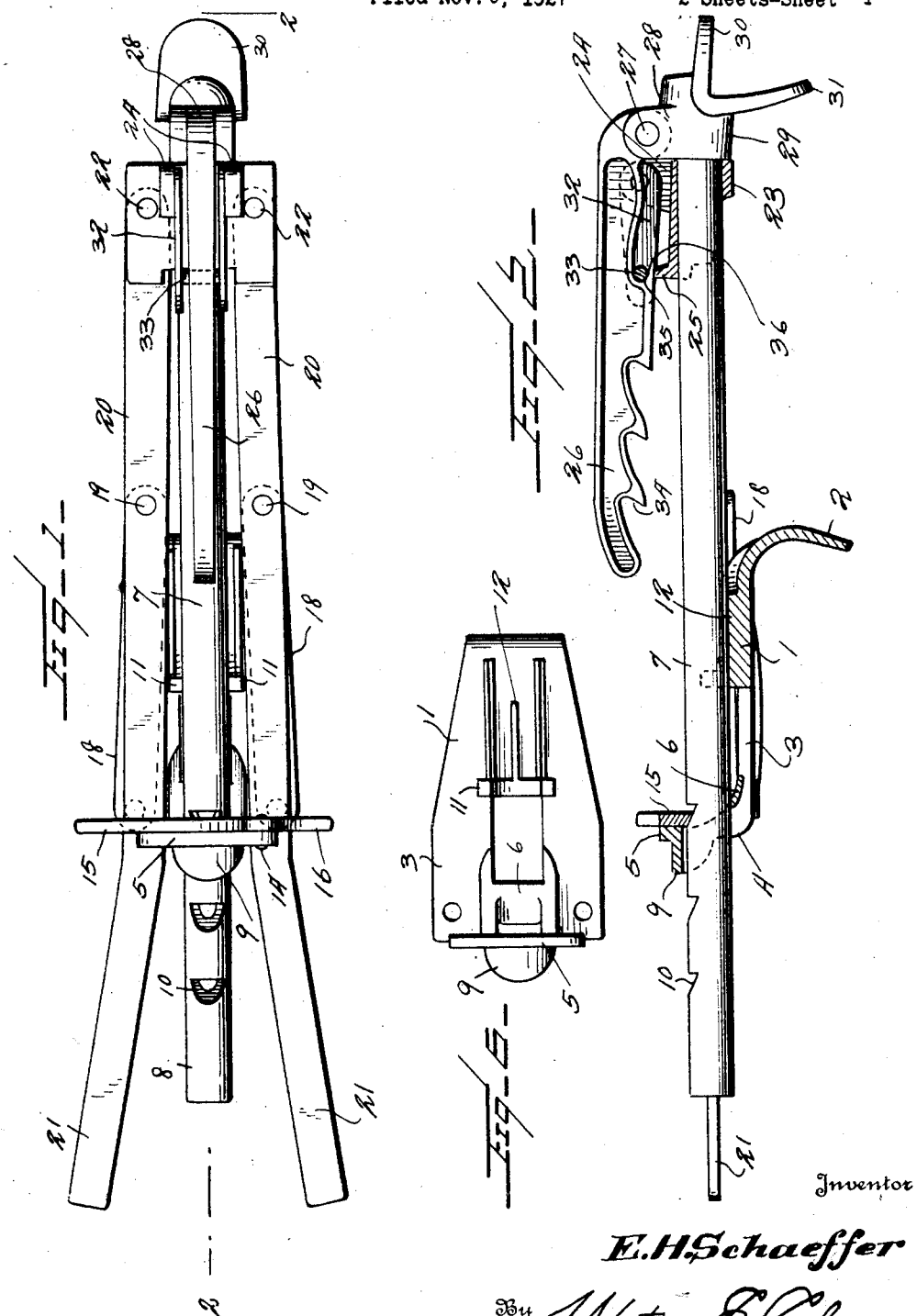

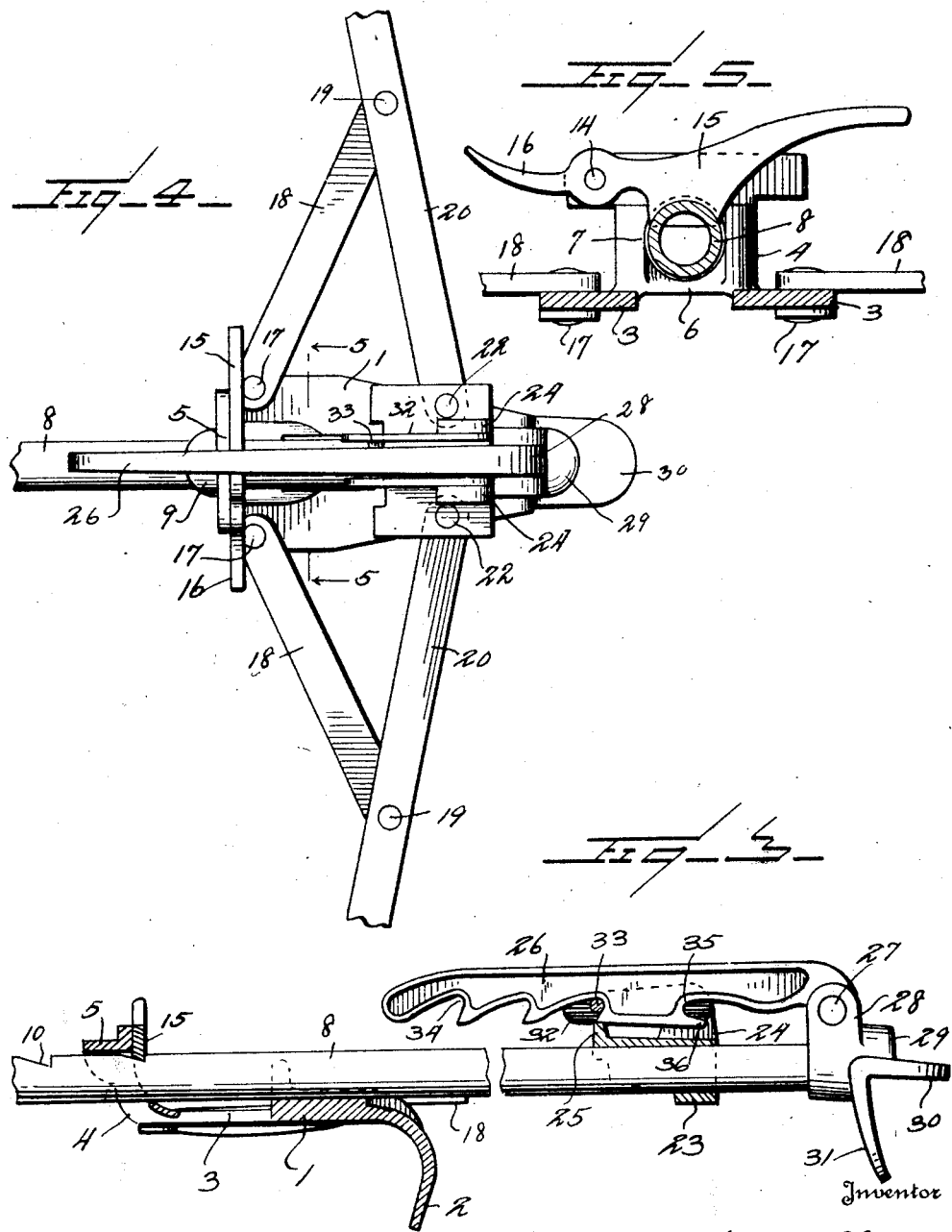

1,682,632

UNITED STATES PATENT OFFICE.

ELMER H. SCHAEFFER, OF READING, PENNSYLVANIA.

TIRE SPREADER.

Application filed November 5, 1927. Serial No. 231,333.

This invention relates to a tire spreader and it is an object of the invention to provide a device of this kind whereby the marginal or edge portions of a tire casing may be readily and conveniently spread to permit ready access within the casing for purposes as may be required.

Another object of the invention is to provide a device of this kind which has relatively movable members moving step by step in a direction one away from the other to facilitate and expediate the desired spreading operation.

The invention consists in the details of construction and in the combination and arrangement of the several parts of my improved tire spreader whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to decribe the same with reference to the accompanying drawings, wherein:—

Figure 1 is a view in top plan of a spreader constructed in accordance with an embodiment of my invention, the parts in closed or compact relation;

Figure 2 is a sectional view taken substantially on the line 2—2 of Figure 1;

Figure 3 is an enlarged fragmentary sectional view partly in side elevation and partly in section of the structure as herein disclosed, certain of the parts in a second position;

Figure 4 is a fragmentary view in top plan of the spreader.

Figure 5 is a sectional view taken substantially on the line 5—5 of Figure 4;

Figure 6 is a view in top plan of the sliding or movable plate as employed.

As disclosed in the accompanying drawings, 1 denotes a plate having at one end a curved lug 2 adapted to engage around one edge marginal portion of the tire casing. At the opposite end portion of the plate is provided a pair of parallel arms 3 having their inner marginal portions at their outer extremities defined by the upstanding members 4 tied or connected at their upper or outer ends by the cross member 5 preferably integrally formed therewith. This cross member 5 has its lower intermediate portion rounded as is the adjacent portion of the arms 4 and the cross member 6 bridging the space between the arms 3 at substantially the junction therewith of the arms 4. By this means an opening 7 is provided through which the bar 8 passes, thus enabling said bar 8 and the plate 1 to have shifting movement one with respect to the other in a direction lengthwise of the bar 8. The rounded portion of the cross member 5 is defined by an outstanding lip or flange 9 the same being of a size to prevent the cross member 5 dropping within any one of the ratchet notches 10 provided in the bar 8.

The plate 1 at its junction with the arms 3 is provided with a pair of upstanding lugs 11 transversely spaced and between which the bar 8 is also freely directed, said bar having contact with an upstanding rib 12. Pivotally connected to the cross member 5 at 14 is a latch lever, the end portion of the latch lever 15 adapted to swing by gravity toward the bar 8 and be selectively or successively engaged in the notches 10 whereby, as will be hereinafter explained, is effected a step by step relative movement in one direction of the bar 8 and the plate 1. The pivoted end portion of the lever 15 is provided with an outstanding tail piece 16 providing means whereby the lever 15 when desired may be readily swung out of engagement with the bar 8.

Pivotally connected as at 17 with the outer end portions of the arms 3 are the rigid links 18 which are also pivotally connected as at 19 to the levers 20 and at points substantially midway the ends of said levers. The rear or outer end extremities of the levers 20 are angularly disposed to provide convenient operating handles 21.

The opposite or forward end portions of the levers 20 are pivotally connected as at 22 to the side marginal portions of the casting 23 slidably mounted on the bar 8 and provided with the transversely spaced upstanding lugs 24. One end portion of the casting 23 is provided with an outstanding lip 25. A lever 26 is pivotally connected as at 27 between the lugs 28 carried by a head 29. This head 29 is fixed to the outer end portion of the bar 8 and is provided with the angularly related lips 30 and 31, the lip 31 being adapted to engage a side edge of a tire casing while the lip 30 is adapted to lie transversely across the edge of the casing when the device is applied thereto.

Pivotally connected with the lugs 24 are the links 32 of desired length and having their outer end portions connected by cross pins 33 adapted to be selectively and successively engaged within the notches 34 provided in the inner longitudinal marginal portion of the lever 26 in a space directed lengthwise thereof. The notches 34 are disposed in a direction away from the pivotal mounting 27 of the lever and the said inner marginal portion of the lever is provided at its inner part with a notch or recess 35 facing said pivotal mounting 27 and provided with a lip 36 which, when the lever 26 is at the limit of its movement toward the bar 8, rests upon the lip 25 hereinbefore referred to and at which time the pin 33 is engaged within the notch 36. Thus means are provided whereby the device is effectively maintained in its folded compact condition. When it is desired to release the pin 33 from within the notch 35 it is only necessary to swing the lever 26 outwardly a distance sufficient to permit the pin 33 to pass from within the notch 35 whereupon the links 32 will swing back toward the bar 8 and contact with the lip 25. Upon release of the lever 26 the same will swing toward the bar 8 and the lip 36 will drop upon or contact from above with the pin 33, thus assuring the parts to be in requisite position for a desired step by step movement to extend or project the bar 8 upon proper manipulation of the levers 20 to secure the desired spreading of the tire casing. As the levers 20 swing outwardly the casting 23 will be moved inwardly of the bar 8 a distance to bring the pin 33 to a position to engage within a notch 34 and during which time the plate 1 is held against forward movement along the bar 9 by engagement of the lever 15 within the notch 10. Upon then swinging the levers 20 inwardly toward the bar 8 the pin 33 will engage within a notch 34 of the lever 26, thus holding the casting 23 against inward movement on the bar 8 and at the same time swinging the plate 1 rearwardly or outwardly until the same has moved sufficiently to permit the lever 15 to engage within a second notch 10. The levers 20 are then swung outwardly and such operations continued until the bar 8 has been projected a distance sufficient to accomplish the desired spreading of the tire. During this operation it is to be understood that the lug 2 of the plate 1 and the lips 30 and 31 of the head 29 have been suitably engaged with the marginal edges of the tire casing. It is to be noted that the links 32 in the assembly are disposed from the lugs 24 in a direction inwardly of the bar 8.

This application is partly in continuation of my application Serial No. 203,817 filed July 6, 1927.

From the foregoing description it is thought to be obvious that a tire spreader constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A tire spreader comprising a plate having a tire engaging lug, links at opposite sides of the plate and pivoted thereto, levers pivoted upon the links, a casting pivoted to the levers, a bar slidably received by the casting, said plate being also slidably engaged with the bar, a head carried by the bar provided with a tire engaging lip, a lever pivoted to the head, and a rigid member pivoted to the casting and having a part engageable with the last named lever.

2. A tire spreader comprising a plate having a tire engaging lug, links at opposite sides of the plate and pivoted thereto, levers pivoted upon the links, a casting pivoted to the levers, a bar slidably received by the casting, said plate being also slidably engaged with the bar, a head carried by the bar provided with a tire engaging lip, a lever pivoted to the head, and a rigid member pivoted to the casting and having a part engageable with the last named lever, said rigid member and the last named lever being disposed inwardly with respect to the head carried by the bar.

3. A tire spreader comprising a plate having a tire engaging lug, links at opposite sides of the plate and pivoted thereto, levers pivoted to the links, a casting pivoted to the levers and having outstanding lugs, links pivoted to the lugs, a cross pin connecting said links, a bar, said plate and casting being slidably mounted on the bar, a head carried by the bar and having a tire engaging lip, and a lever pivoted to the head and having notches therealong to receive the cross pin.

4. A tire spreader comprising a plate having a tire engaging lug, links at opposite sides of the plate and pivotally connected thereto, levers pivoted to the links, a casting to which the levers are also pivotally connected, a bar, the plate and casting being mounted for sliding movement on the bar, a head carried by the bar outwardly of the applied casting provided with a tire engaging lug, and coacting means carried by the head and casting and by the plate and bar to effect an intermittent outward movement of the bar upon oscillating the levers.

5. A tire spreader comprising a plate having a tire engaging lug, links at opposite sides of the plate and pivoted thereto, levers pivoted upon the links, a casting pivoted to the levers, a bar slidably received by the casting, said plate being also slidably mounted upon the bar, a head carried by the bar provided with a tire engaging lip, a lever pivoted to the head, a rigid member pivoted to the casting and having a part engageable with the last named lever, and coacting means carried by the bar and plate for holding the plate against movement on the bar toward the head.

6. A tire spreader comprising a plate having a tire engaging lug, links at opposite sides of the plate and pivotally connected thereto, levers pivoted upon the links, a casting pivoted to the levers and having outstanding lugs, links pivoted to the lugs, a cross pin connecting said links, a bar, said plate and casting being slidably mounted on the bar, a head carried by the bar and having a tire engaging lip, and a lever pivoted to the head and having notches therealong to receive the cross pin, said lever of the head being provided at its inner part with a notch disposed toward the head and adapted to receive the pin when the parts of the device are compact.

In testimony whereof I hereunto affix my signature.

ELMER H. SCHAEFFER.